United States Patent [19]
Johnston

[11] 3,732,473
[45] May 8, 1973

[54] INVERTER COMMUTING CAPACITOR CHARGE CONTROL CIRCUIT

[75] Inventor: Richard W. Johnston, Troy, Mich.

[73] Assignee: General Motors Corporation, Detroit, Mich.

[22] Filed: Aug. 26, 1971

[21] Appl. No.: 175,136

[52] U.S. Cl. .................. 318/227, 321/5, 321/45 C
[51] Int. Cl. ................................................ Ho2m
[58] Field of Search .............. 321/5, 45 R, 45 C; 318/227

[56] References Cited

UNITED STATES PATENTS 3,414,800  12/1968  Sheldrake et al. .................. 321/5
3,388,310  6/1968  Etter .................................. 321/5

FOREIGN PATENTS OR APPLICATIONS 1,373,115  8/1964  France .............................. 321/5

Primary Examiner—William H. Beha, Jr.
Attorney—E. W. Christen et al.

[57] ABSTRACT

An inverter commuting capacitor is connected in shunt with a series combination of an inductor and a controlled rectifier to limit the transient time of the commuting capacitor during commutation. Energy stored in the commuting capacitor is used to commute the inverter's power controlled rectifiers at predetermined times, and energy stored in the motor windings is transferred to the capacitor during the transient period of commutation to prepare the capacitor for the subsequent commutation. The inductor connected in shunt with the commuting capacitor increases the natural frequency of the LC circuit comprised of the commuting capacitor and the motor winding when the controlled rectifier connected in series with the inductor is gated conductive. In this manner, a reduction in the transient time of the capacitor is effected.

2 Claims, 3 Drawing Figures

INVENTOR.
Richard W. Johnston

INVENTOR.
Richard W. Johnston
BY
C. L. Meland
ATTORNEY

3,732,473

INVERTER COMMUTING CAPACITOR CHARGE CONTROL CIRCUIT

This invention relates to an inverter power supply for powering an AC motor from a source of direct voltage and in particular provides improved high frequency performance by reducing the time of voltage transient from the commuting capacitor of the inverter.

Inverter motor supply circuits are generally known for supplying AC motors and particularly AC induction motors from direct current power sources. These known arrangements rely on controlled rectifiers included in the inverter to develop alternating voltage at the inverter output by sequential and periodic switching. These motor feed arrangements are known for use with Y-connected, Delta-connected or separately connected motor winding configurations. The Y-connected and Delta-connected windings are more generally used for low horse-power motors. However, motor feed arrangements using separately connected motor windings are advantageously used for high horse-power motors since twice as many controlled rectifiers are used and the individual voltage requirement for each controlled rectifier is reduced to one-half the voltage requirement encountered in Y-connected or Delta-connected motor supplies.

In separately connected winding inverter motor supply systems, it is necessary that commutation of a power controlled rectifier supplying a particular phase winding be complete prior to the time a second power controlled rectifier is gated conductive to reverse the polarity of current supplied that phase winding. Otherwise, a short circuit across the direct voltage source through the two power controlled rectifiers results. For Y-connected and Delta-connected motor supply systems, it is also necessary to complete commutation prior to reversing the polarity of current in a phase winding to obtain proper motor operation. Thus, it should be appreciated, high frequency operation is limited in inverter motor supply systems by the time required for shutting off power controlled rectifiers. Since the inverter is supplied a direct voltage input, auxiliary commutation is required to shut off the power controlled rectifiers.

Most auxiliary commutation systems use a commuting capacitor as an energy storage device to supply the energy required for commutation. In various known commuting capacitor configurations, the capacitor is discharged during a particular commutation and recharged with an opposite polarity to prepare it for the subsequent commutation. The discharging and recharging involve transferring energy between the motor winding and the commuting capacitor and the time required for the commuting capacitor to fully discharge and reverse the polarity of its charge is the time under consideration as the frequency limit. This time is the total system recovery time for the commutation of a power controlled rectifier.

The instant invention, unlike prior art auxiliary commutation systems, modifies the natural frequency associated with the motor winding, commuting capacitor LC ringing circuit to reduce the time of the capacitor transient. This is accomplished by placing an inductor in series with a controlled rectifier in shunt with the commuting capacitor and gating the controlled rectifier at a predetermined time in relation to the commutation to increase the natural frequency of the LC ringing circuit during the capacitor transient to effect a reduction in the time of the transient.

Accordingly, it is an object of the present invention to limit the transient time of a commuting capacitor included in an inverter supply system providing energization for an AC motor from a direct voltage source by controlling the frequency of the motor winding, commuting capacitor LC ringing circuit.

Another object of the present invention is to provide an inductor for shunt connection with the commuting capacitor of an inverter motor power supply system to modify the transient time of the commutation to enhance the high frequency performance of the inverter.

An additional object of the present invention is to provide a series connection of an inductor and a controlled rectifier in shunt with the commuting capacitor of an inverter motor supply system and to gate the controlled rectifier at a predetermined time during the commutation of a power controlled rectifier to reduce the time required for the commuting capacitor to fully discharge and recharge with an opposite polarity.

Additional objects and advantages of the present invention will be apparent from the following description wherein the figures listed below are incorporated as illustrating the preferred embodiment.

Figure 1:
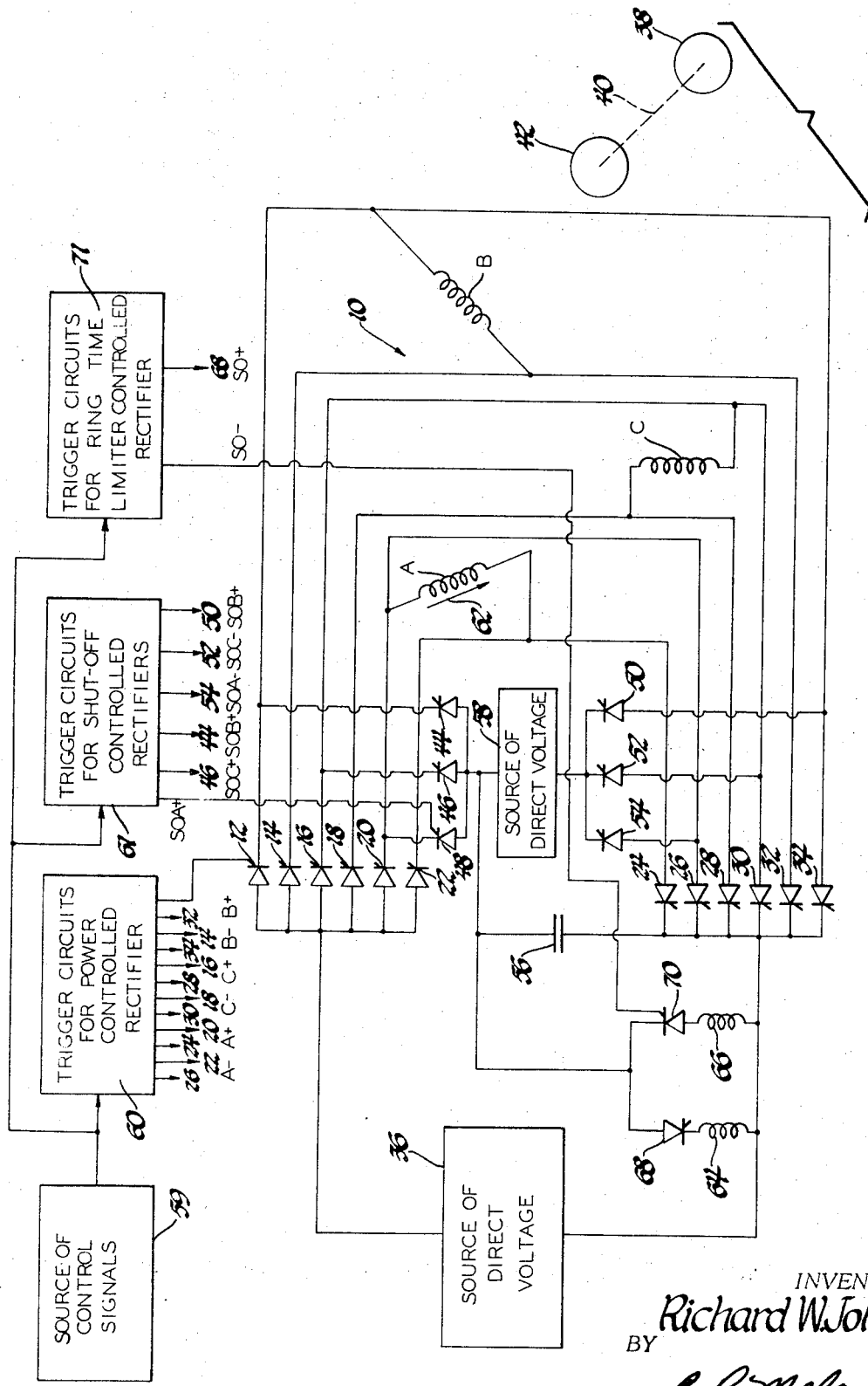
FIG. 1 is a circuit schematic of an inverter motor power supply for an AC induction motor having separately connected motor windings including the transient time limiting circuit of the present invention.

Reference should now be made to the drawings and more particularly to FIG. 1 wherein an inverter motor supply system is shown for energizing an AC induction motor having its motor windings connected with the inverter for independent excitation. The three motor phase windings A, B, and C of the induction motor 10 are supplied alternating voltage by the 12 power controlled rectifiers 12, 14, 16, 18, 20, 22, 24, 26, 28, 30, 32, and 34 connected with the source of direct voltage 36. The induction motor 10 drives a load 38 through an output connection 40 to the rotor 42. The source of direct voltage 36 can take a variety of forms generally known in the art, and in particular, it is noted that this direct voltage source can take the form of a variable voltage source, if desired for a particular application. An example of the circuit required for the direct voltage source 36 is a full wave bridge rectifier converting an AC input to the required DC output; in this arrangement a variable voltage is obtained if controlled rectifiers are included in the bridge to regulate the amplitude of the direct voltage output.

Inasmuch as the power controlled rectifiers 12 to 34 are connected with a direct voltage source, it is necessary to provide auxiliary commutation to terminate each conduction interval. This auxiliary commutation is performed by the six shut-off or commuting controlled rectifiers 44, 46, 48, 50, 52, and 54, a commuting capacitor 56, and a source of direct voltage 58.

A source of control signals 59 effects primary control of the inverter operation according to a preselected control scheme. For example, slip speed control can be obtained if the source of control signals 59 includes a tachometer signal measurement of the operating speed of the induction motor 10 and an auxiliary slip frequency control signal. Such a slip speed control motor supply system is more completely described in U.S. Pat. No. 3,323,032 Agarwal. The Agarwal patent describes in detail the control required for the source of control signals 59 to effect slip frequency control.

Twelve trigger outputs from the trigger circuits 60 provide gate trigger signals to the power controlled rectifiers 12 to 34 to initiate all conductive intervals by the respective power controlled rectifiers. The twelve outputs are represented in the drawing as arrows and it should be appreciated that in actual application, gate-cathode connections would be required between each power controlled rectifier and the trigger circuits 60. The trigger circuits 60 are controlled by the source of control signals 59 and all gate signals applied to the controlled rectifiers 12 to 34 are, accordingly, initiated in response to signals from the source of control signals 59.

The source of control signals 59 is also connected with a second set of trigger circuits 61. The trigger circuits 61 provide six output connections to the commuting controlled rectifiers 44 to 54. As noted for the power controlled rectifier trigger circuits 60, the commuting controlled rectifier trigger circuits 61 would require a gate and cathode connection for each shut-off controlled rectifier to the trigger circuits 61. A signal is provided by the trigger circuits 61 for each gate signal provided by trigger circuits 59 to provide sequential and periodic operation of the power controlled rectifiers.

Trigger circuitry of the type required for the power controlled rectifier trigger circuits 60 and the shut-off controlled rectifier trigger circuits 61 is generally known in the art of motor control. One arrangement suitable for inclusion in the system of the drawing is fully disclosed and described in copending application Ser. No. 60,398, Richard W. Johnston et al., entitled "Shutter Wheel Tachometer," now U.S. Pat. No. 3,611,090. In that system, a logic array is used to generate the requisite synchronized and controlled trigger signals. It is noted that the present inverter system has twelve power controlled rectifiers whereas the system disclosed in application Ser. No. 60,398 includes only six power controlled rectifiers. The six trigger signals provided by the trigger logic in the application Ser. No. 60,398 system are readily adapted for control of the 12 controlled rectifiers shown in the drawing, since the 12 controlled rectifiers are gated conductive in pairs in a manner more fully discussed below.

In operation, the three phase windings A, B, and C of induction motor 10 are separately energized, and each is alternately provided oppositely directed energizing currents. For example, when controlled rectifiers 20 and 24 are conductive, phase winding A is provided a current having a direction represented by the arrow 62. On the other hand, when controlled rectifiers 22 and 26 are conductive, the phase winding A is provided a current having a direction opposite to that of the arrow 62. A similar result obtains for each of the remaining phase windings B and C when the power controlled rectifiers connected with them are gated conductive in pairs. Thus, it should be appreciated that sequential and periodic gating of the power controlled rectifiers 12 to 34 results in the application of AC voltage to the induction motor 10 driving the rotor 42 and the load 38.

The single commuting capacitor 56 is used in the commutation of all twelve power controlled rectifiers at their appointed times. In the control system of the drawing of FIG. 1, a pair of inductors 64 and 66 are connected serially with two controlled rectifiers 68 and 70 in shunt with the commuting capacitor 56. A bi-lateral switching device could be employed instead of the two controlled rectifiers 68 and 70 in combination with a single inductor to accomplish the same result as that disclosed in the drawing. The controlled rectifiers 68 and 70 are gated by trigger signals derived from the trigger circuits 71. These trigger signals are represented by arrows in the drawing and as with the other controlled rectifiers, a practical circuit would require gate and cathode connections between the controlled rectifiers 68 and 70 and the trigger circuits 71 to carry the turn on signals. A connection between the source of control signals 59 and the trigger circuits 71 synchronizes the timing of gate signals to the controlled rectifiers 68 and 70 with the application of gate signals to the shut-off controlled rectifiers 44 to 54.

Trigger circuits 71 can take the form of the trigger circuitry shown in application Ser. No. 60,398. Of course, other known trigger circuit arrangements could also be adapted to generate the required triggers. The trigger output signals from trigger circuits 71 are delayed from the trigger output signals from the shut-off trigger circuits 61. Thus, these trigger circuits 71 would be provided with a delay similar to the delay provided for the power controlled rectifier trigger circuits in application Ser. No. 60,398. The delay time for the trigger circuits 71 is generally less than the delay for the power controlled rectifier triggers 60. In application Ser. No. 60.398, a shift register is used to control trigger output signals and the requisite control for the trigger circuits 71 could be readily developed in a manner analogous to that disclosed in application Ser. No. 60,398 by one skilled in the art.

Figure 2:
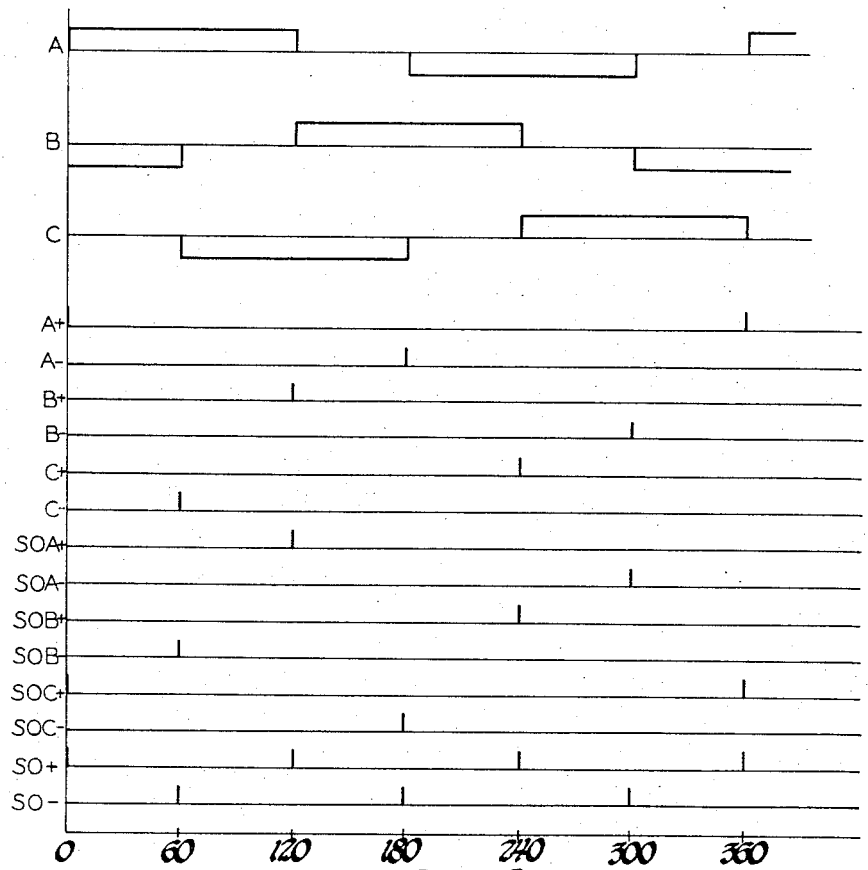
FIG. 2 is a graph displaying the time sequence for gate signals required in the operation of the inverter motor power supply system of FIG. 1.

An understanding of the operation of the motor supply of FIG. 1 is facilitated by considering its operation in conjunction with the graph of FIG. 2. In the graph, the voltages supplied phase windings A, B, and C are shown and are there labeled A, B, and C, respectively. In this graphical summary, 120 degree energization intervals are shown with 60 degree nonconductive separations. Naturally, the voltage across a particular phase winding would deviate from the rectangular waveforms shown in FIG. 2 since the FIG. 2 graphs depict theoretical voltages which would be modified in practice.

To initiate conduction of power controlled rectifiers 20 and 24 at zero degrees, as is required for the start of a positive voltage pulse to phase winding A, an A+ trigger signal is required. The six trigger pulse trains shown in FIG. 2 are labeled A+, A−, B+, B−, C+, and C− to agree with the voltage pulses initiated by the respective trigger signals. Commuting trigger signals are labeled SOA+, SOA−, SOB+, SOB−, SOC+, and SOC− to indicate the termination of the respective voltage pulses terminated by the shut-off trigger signals. For example, SOA+ terminates the A+ voltage pulse, etc. The final group of controlled rectifier trigger signals is labeled SO+ and SO− according to the fact that each positive shut-off gate signal is followed by a pulse in the SO+ pulse train and each negative shut-off gate signal is followed by a pulse in the SO− pulse train.

In the drawing of FIG. 1, the power controlled rectifier trigger circuits 60 generate the A+, A−, B+, B−, C+, and C− trigger signals. The commuting controlled rectifier trigger circuits 61 generate the SOA+, SOA−, SOB+, SOB−, SOC+, and SOC− trigger signals. And the trigger circuits 71 generate the SO+ and SO− trigger signals.

At zero degrees, the A+ trigger signal gates both controlled rectifier 20 and controlled rectifier 24 conductive to initiate a positive voltage to phase winding A providing current in the direction of arrow 62. Prior operation is assumed for this example, and accordingly, phase B has continuity for its negative voltage pulse which was commenced 60 degrees before the zero degree reference. At zero degrees, the positive voltage which had been applied to phase winding C is terminated when a trigger signal SOC+ is supplied by the trigger circuits 61 to controlled rectifier 46. In practice, as noted above, the trigger signal A+ is delayed a predetermined time from the trigger signal SOC+. All the trigger pulses to the power controlled rectifiers are delayed from the shut-off pulses which occur at the same nominal times. The balance of this explanation will be in terms of nominal times, but it should be borne in mind that a predetermined delay is used in practice.

Controlled rectifiers 16 to 28 were conductive immediately prior to zero degrees to provide the positive voltage to phase winding C. At zero degrees, shut-off controlled rectifier 46 is supplied the SOC+ trigger signal and commuting capacitor 56 charged with a positive polarity on the terminal connected to the commuting controlled rectifier 46 provides reverse bias to power controlled rectifier 16 terminating conduction therethrough. Capacitor 56 connects a reverse bias voltage across the series combination of power controlled rectifier 16 and the source of direct voltage 36. Since the voltage of capacitor 56 exceeds the voltage level of the source 36, the power controlled rectifier 16 is effectively biased to its nonconductive state.

The twelve power controlled rectifiers 12 to 34 are of two distinct types: six of the twelve being fast recovery power controlled rectifiers and six having a relatively longer recovery time. Power controlled rectifiers 12, 16, 20, 26, 30, and 34 are of the fast recovery variety, whereas power controlled rectifiers 14, 18, 22, 24, 28, and 32 have relatively longer recovery times. This disparity in recovery time is necessary to ensure that a particular power controlled rectifier in each pair is first to cease conduction. This choice of recovery times is readily satisfied by selection of commercially available silicon controlled rectifiers.

After power controlled rectifier 16 ceases conduction as a consequence of the reverse bias voltage applied by commuting capacitor 56, current in phase winding C is sustained by the energy stored on capacitor 56 and current continuity is completed from the positive plate of capacitor 56 through commuting controlled rectifier 46, through the phase winding C, and through power controlled rectifier 28 to the negative plate of commuting capacitor 56. Both phase winding C and commuting capacitor 56 have energy stored in their respective magnetic and electric fields which must be dissipated prior to termination of conduction by power controlled rectifier 28 and commuting controlled rectifier 46. This transient condition of the commuting capacitor 56 and its associated time is the limiting consideration for high frequency operation of the inverter motor supply of FIG. 1. This follows from the fact that the transient must subside prior to the initiation of a negative voltage energization interval for phase winding C through power controlled rectifiers 30 and 18. Otherwise, a direct short circuit across source 36 is completed through controlled rectifiers 18 and 28.

The time of the transient of commuting capacitor 56 is dependent on the natural frequency of the LC circuit comprised of the capacitor 56 and the motor winding of phase C. Foreshortening of the transient time is accomplished according to the present invention by gating controlled rectifier 68 subsequent to the cessation of current through power controlled rectifier 16 to connect inductor 64 in shunt with commuting capacitor 56. The effect of this shunt connection can be grasped from two separate analyses of the circuit. First, it should be appreciated that the inclusion of inductor 64 reduces the inductance connected with commuting capacitor 56 and, accordingly, effects an increase in the natural frequency of the associated LC circuit. A second consideration facilitating an understanding is the operation viewed as the process of discharging and reversing the polarity of commuting capacitor 56 such that it finally has a positive polarity on the plate connected with the cathode of power controlled rectifier 28. Dissipation of energy stored in the field of phase winding C accelerates as the voltage on the capacitor 56 increases. The shunt path through inductor 64 works to this end by increasing the rate of change of the positive going voltage on the capacitor 56 at the plate connected with power controlled rectifier 28. Thus, the voltage presented by the capacitor to the phase winding C causes a more rapid dissipation of the phase winding energy and a more rapid attainment of steady state for the capacitor 56.

When the commuting capacitor 56 is fully charged with a positive voltage on the plate connected with power controlled rectifier 28, additional current flow between the capacitor plates is precluded since any additional current would by necessity flow in the reverse direction and the controlled rectifiers 28 and 68 are unidirectional. Thus, the transient period terminates and both power controlled rectifier 28 and controlled rectifier 68 are inherently commuted.

Operation continues through the first 60 degrees of the cycle and at the 60 degree point, a C− trigger pulse is provided by trigger circuits 60 gating power controlled rectifiers 18 and 30 conductive to initiate a negative voltage pulse to phase winding C. Also, an SOB− trigger pulse is supplied commuting controlled rectifier 50 to terminate the negative voltage to phase winding B at 60 degrees.

When commuting controlled rectifier 50 is gated conductive, the series combination of the voltage of source 58 and the voltage on capacitor 56 is connected across power controlled rectifier 34 to terminate conduction therethrough according to the reverse bias applied to the power controlled rectifier 34. It should be recalled that power controlled rectifier 34 is characterized by fast recovery. Subsequent to the recovery of power controlled rectifier 34, current flow through the phase winding B is sustained through the path from the then positively charged plate of commuting capacitor 56, through the source 36, through power controlled rectifier 14, through phase winding B, through commuting controlled rectifier 50, through the source 58 to the negatively charged plate of commuting capacitor 56. It should be appreciated that the same considerations limned above are pertinent to the transient time for commuting capacitor 56. To expedite the attainment of steady state, controlled rectifier 70 is gated conductive connecting inductor 66 in shunt with commuting capacitor 56. The effect of inductor 66 is the same as that described above in conjunction with the inclusion of inductor 64. The remaining trigger pulses and their control of the inverter's operation is analogous to that described, substitution of phase windings and controlled rectifiers comprising the only change.

By way of example, some typical high frequency times for the operation of the inverter motor supply system will be given. For a four pole motor operating at approximately 12,000 RPM, 60 degrees is on the order of 400 microseconds. A typical fast recovery controlled rectifier requires 30 microseconds for recovery time. In operation, 80 microseconds is adequate to ensure the fast recovery controlled rectifiers have terminated conduction and, accordingly, a 100 microsecond delay is appropriate for gating controlled rectifiers 68 and 70 after the application of shut-off gate signals. The slow recovery controlled rectifiers require 80 microseconds for recovery. The recovery times for both fast and slow recovery controlled rectifiers are given for applications involving currents on the order of 200 amps as could be encountered in the motor operation. Power controlled rectifiers are gated after a delay on the order of 200 microseconds measured from the gating of the shut-off controlled rectifiers.

Figure 3:
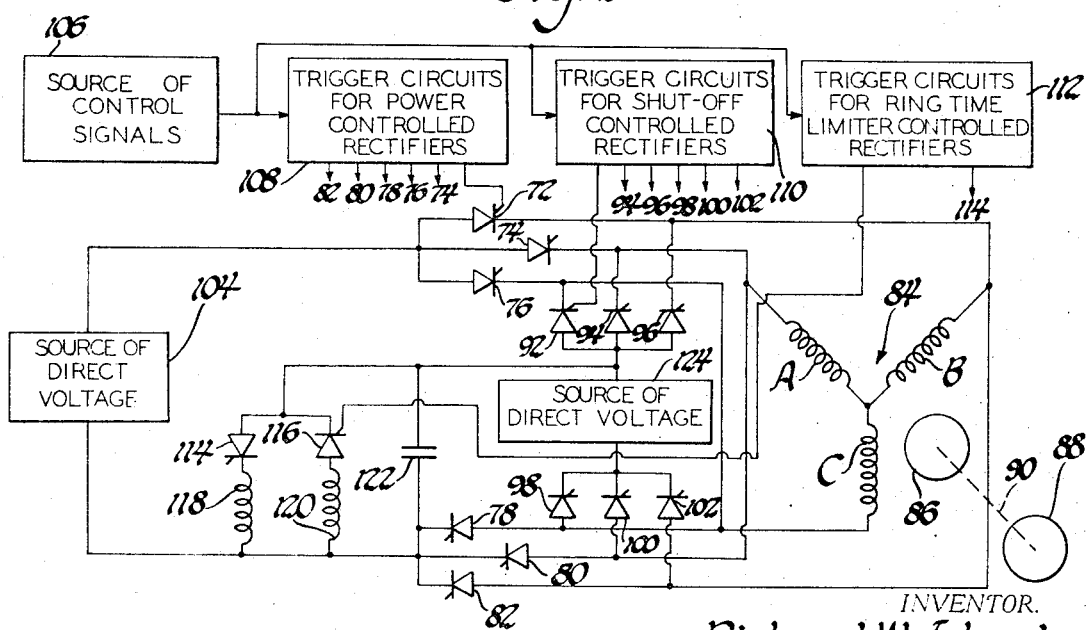
FIG. 3 is a circuit schematic depicting the transient time limiting circuit of this invention in combination with a Y-connected induction motor inverter power supply.

Reference should now be made to FIG. 3 wherein an inverter motor power supply is shown for powering a Y-connected AC induction motor. The commuting capacitor time limiting arrangement of the instant invention is shown in the FIG. 3 Y-connected motor supply arrangement. The inverter includes a single commuting capacitor for commutation. Six power controlled rectifiers 72, 74, 76, 78, 80 and 82 carry the energizing currents to the phase windings A, B, and C of the induction motor 84. The motor's rotor 86 drives a load 88 through output linkage 90. Six shut-off controlled rectifiers 92, 94, 96, 98, 100, and 102 are required to commute the six power controlled rectifiers at predetermined times to develop AC voltage for the motor 84. The source of direct voltage 104 connected at the input of the inverter supplies the power necessary for operation.

A source of control signals 106, trigger circuits 108 for the power controlled rectifiers, trigger circuits 110 for the shut-off controlled rectifiers, and trigger circuits 112 for the time limiter controlled rectifiers provide control of the inverter operation in identically the same manner as that detailed above for the circuit of FIG. 1. The two controlled rectifiers 114 and 116 are connected with the trigger circuits 112 to determine the time at which inductors 118 and 120 are connected in shunt with the commuting capacitor 122. A source of direct voltage 124 completes the commutation circuitry of the inverter.

In operation, the source 104 is sequentially and alternately connected by power controlled rectifiers 72 to 82 with the phase windings A, B, and C of the motor 84 to effect motor operation. The power controlled rectifiers are conductive in pairs to supply two of the three phase windings at any given time. For example, when power controlled rectifiers 74 and 78 are conductive, phase windings A and C are energized by current having the direction of the arrows shown in the drawing. By energizing controlled rectifiers 76 and 80, the same two phase windings are energized by current having a direction opposite to that shown.

For commutation, the capacitor 122 is connected with the power controlled rectifier to be commuted by one of the six shut-off controlled rectifiers 92 to 102. In this manner, a reverse bias is applied to that power controlled rectifier rendering it nonconductive. For example, when the commuting capacitor is charged with the polarity indicated in the drawing and power controlled rectifiers 74 and 78 are conductive, power controlled rectifier 74 would be commuted by gating shut-off controlled rectifier 94 connecting the capacitor with power controlled rectifier 74 to reverse bias that controlled rectifier. In this situation, the voltage of the capacitor sustains motor current through windings A and C through the path from the positive plate of the capacitor 122 through shut-off controlled rectifier 94, phase windings A and C, and power controlled rectifier 78 to the negative plate of the capacitor 122.

Controlled rectifier 72 is gated after controlled rectifier 74 is rendered nonconductive to initiate current flow through windings B and C of the motor 84. However, energy stored in phase winding A must be dissipated prior to the time controlled rectifier 80 is gated conductive to initiate current flow in the opposite direction through phase winding A. This should be appreciated as the consequence of controlled rectifier operation wherein conduction is precluded and the controlled rectifier is rendered or maintained nonconductive when current flow is required from cathode to anode. Thus, if phase winding A persists in providing current in the direction of the arrow after controlled rectifier 80 is gated conductive, the controlled rectifier 80 will not be able to switch to its conductive state. This is the limiting consideration at high frequency since 60 degrees of time is the separation between the turning off of controlled rectifier 74 and the gating conductive of controlled rectifier 80. Thus, the current through phase winding A must terminate within 60 degrees, and it is noted that this time limitation is identical to that for the configuration of FIG. 1.

As in the FIG. 1 explanation, inductors 118 and 120 are included to reduce the time of the commutation transient associated with capacitor 122, this commutation transient being defined, for the example, as the time commencing with the gating of controlled rectifier 94 and characterized by the changing current and voltage of capacitor 122 required to reverse bias controlled rectifier 74 and sustain current in phase windings A and C. This commutation transient concludes when the capacitor 122 attains a charge of the polarity opposite of that shown in the drawing and when controlled rectifier 94 ceases conduction. The reduction in the commutation transient time is identical to that described and explained above. In the example under consideration, controlled rectifier 114 is gated after a predetermined delay from the gating of controlled rectifier 94 to connect inductor 118 in shunt with the capacitor 122. Inductor 118 causes the voltage on capacitor 122 to reverse polarity at a more rapid rate as discussed in the text above for FIG. 1 and, accordingly, reduces the time of the capacitor transient.

The remaining operational aspects of the FIG. 3 inverter supply follow directly from the example. The only variation is the controlled rectifiers involved at the various switching times. The commuting capacitor 122 alternates in polarity as it is required to shut off the various controlled rectifiers 72 to 82. All the power controlled rectifiers in the inverter of FIG. 3 are of the fast recovery type discussed above.

Although this invention has been disclosed with reference to a preferred embodiment, it should be appreciated by those skilled in the art that various modifications and changes can be engrafted thereon within the scope of the appended claims.

I claim:

1. An inverter power supply system for an electric motor comprising, an electric motor having a winding, an inverter having an output connected to said winding and an input connected to said source of direct voltage, said inverter having a plurality of power controlled rectifiers connected between said source of direct voltage and said motor winding, a commuting capacitor, a commuting controlled rectifier, commutation means connecting said commuting capacitor and said commuting controlled rectifier to effect commutation of a predetermined power controlled rectifier in response to gate signals to said commuting controlled rectifier, an inductor, a controllable switching device, a control circuit including in a series connection said controllable switching device and said inductor, means connecting one end of said control circuit to one end of said capacitor at a first junction, means connecting the opposite end of said control circuit to the opposite end of said capacitor at a second junction whereby said capacitor is shunted by said series connected inductor and controllable switching device, conductor means excluding said inductor and forming a part of said commutation means connecting said first and second junctions to certain controlled rectifiers of said inverter, a synchronized means for gating first said commuting controlled rectifier and after a delay said controllable switching device and said power controlled rectifiers to conductive states according to a predetermined time sequence, said commuting capacitor providing reverse bias to terminate conduction by the power controlled rectifier connected with said commuting capacitor and changing the polarity of voltage on said commuting capacitor by extracting energy from the magnetic field of said motor winding during the commutation transient associated with commutation, said inductor effecting a reduction in the time of the commutation transient of said commuting capacitor at commutation by expediting the dissipation of energy stored in said motor winding according to the interaction of said motor winding, said commuting capacitor, and said inductor when said controllable switching device is gated conductive.

2. An AC motor power supply comprising, a source of direct voltage, an AC motor, an inverter having DC input terminals and AC output terminals, a plurality of power controlled rectifiers included in said inverter, means connecting said source of direct voltage with said DC input terminals, means connecting said AC motor with said AC output terminals, commutation means connected with said power controlled rectifiers including at least one capacitor and a plurality of commuting controlled rectifiers, a first source of control signals connected with said power controlled rectifiers, a second source of control signals connected with said commuting controlled rectifiers, said first and second sources of control signals cooperating to control the operation of said inverter by gating their respective controlled rectifiers conductive according to a predetermined switching sequence, an inductor, a controlled rectifier, a control circuit including in a series connection said controlled rectifier and said inductor, means connecting one end of said control circuit to one end of said capacitor at a first junction, means connecting the opposite end of said control circuit to the opposite end of said capacitor at a second junction whereby said capacitor is shunted by said series connected inductor and controlled rectifier, conductor means excluding said inductor and forming a part of said commutation means connecting said first and second junctions to certain controlled rectifiers of said inverter, and a third source of control signals providing trigger signals to said controlled rectifier at predetermined times delayed in time from the gating signals applied to said commuting controlled rectifiers by said second source of control signals, said inductor coacting with the inductance of said motor to reduce the time for extracting stored energy from the motor winding by reducing the time for discharging the voltage of the commuting capacitor when said controlled rectifier is gated conductive.

* * * * *